United States Patent [19]

Kovacs

[11] 4,372,852
[45] Feb. 8, 1983

[54] MAGNETIC DEVICE FOR TREATING HYDROCARBON FUELS

[76] Inventor: Albert J. Kovacs, 1929 Fremont Ave., Apt. H, South Pasadena, Calif. 91030

[21] Appl. No.: 207,644

[22] Filed: Nov. 17, 1980

[51] Int. Cl.³ .............................................. B01D 35/06
[52] U.S. Cl. .................................................... 210/222
[58] Field of Search ............... 123/536, 537, 538, 539; 55/100; 210/222, 223

[56] References Cited

U.S. PATENT DOCUMENTS

| | | | |
|---|---|---|---|
| 3,177,633 | 4/1965 | McDonald, Jr. | 55/100 |
| 3,206,657 | 9/1965 | Moriya | 210/222 |
| 3,228,878 | 1/1966 | Moody | 210/222 |
| 3,349,354 | 10/1967 | Miyata | 210/222 |
| 3,830,621 | 8/1974 | Miller | 210/222 |
| 3,989,017 | 11/1976 | Reece | 123/536 |
| 4,176,065 | 11/1979 | Cook | 55/100 |
| 4,201,140 | 5/1980 | Robinson | 210/222 |
| 4,299,700 | 11/1981 | Sanderson | 210/222 |

*Primary Examiner*—Thomas G. Wyse
*Attorney, Agent, or Firm*—Charles H. Schwartz; Ellsworth R. Roston

[57] ABSTRACT

A magnetic device for treating hydrocarbon fuel, including a passageway having an inlet and an outlet for the passage of the hydrocarbon fuel, a pair of elongated magnets and with each magnet magnetized to have one pole extending along one longitudinal face and the other pole extending along the opposite longitudinal face, the pair of magnets located along and on opposite sides of the passageway and with the faces of the magnets having like poles spaced from and substantially parallel to each other, and the pair of magnets providing a substantially unipolar flux field on fuel flowing in the passageway.

8 Claims, 4 Drawing Figures

MAGNETIC DEVICE FOR TREATING HYDROCARBON FUELS

The present invention is directed to a magnetic device for treating hydrocarbon fuel and in particular the present invention is directed to a magnetic device for treating the fuel as the fuel flows through the device and with the device subjecting the fuel to a powerful unipolar magnetic field.

With a particular embodiment of the magnetic device of the present invention, the fuel passes through a passageway formed by spaced magnets positioned within an outer non-magnetic casing and with the magnets subjecting the fuel in the passageway to a powerful substantially unipolar magnetic flux field.

In the prior art there have been a number of devices which impose a magnetic field on a hydrocarbon fuel. In particular, reference is made to a number of patents listing Suburo Miyata as the inventor and with particular reference to Miyata U.S. Pat. No. 3,349,354. In this prior art patent, hydrocarbon fuels are subjected to a substantially unipolar magnetic flux produced by four magnets at right angles to each other arranged around a tube of square configuration. The tube is made of mild steel and the fuel flows through the tube of mild steel. Because of the use of four magnets, each at right angles to each other, and because the magnets are arranged around a tube of mild steel, it has been determined that the magnetic fields within the passageway through the tube, particularly in the center of the passageway, are substantially attenuated and the fields concentrated towards the corners. The prior art device shown in U.S. Pat. No. 3,349,354 therefore does not provide for as great a magnetic flux field on the fuel as desired.

The present invention provides for a much more powerful substantially unipolar magnetic flux within the passageway than the prior art devices. In addition, the present invention is very simple in construction, and in a particular embodiment uses a pair of elongated magnets spaced from each other along their length and with the passageway for the fuel formed by the spacing between the pair of magnets. The individual magnets are magnetized to have one pole extending along one longitudinal face and the other pole extending along the opposite longitudinal face and with the pair of magnets housed within an outer casing of non-magnetic material with like poles facing each other. The normal repelling force between the magnets holds the magnets in position against the inner walls of the non-magnetic casing.

With the apparatus of the present invention, no mild steel tubing is used so that the magnetic flux field formed by the opposing flux fields of the pair of magnets is intense within the passageway formed between the magnets, and since the magnets are arranged with one flat face of one of the magnets closely adjacent one flat face of the other magnet. This maximizes the intensity of the flux field in the passageway so as to maximize the effect of the flux field on the hydrocarbon fuel as the fuel passes over the magnetic surfaces and in direct contact with the magnetic surfaces. A pair of end caps including inlet and outlet fittings are used to connect the device of the present invention within the fuel line.

A clearer understanding of the invention will be had with reference to the following description and drawings wherein.

Figure 1:
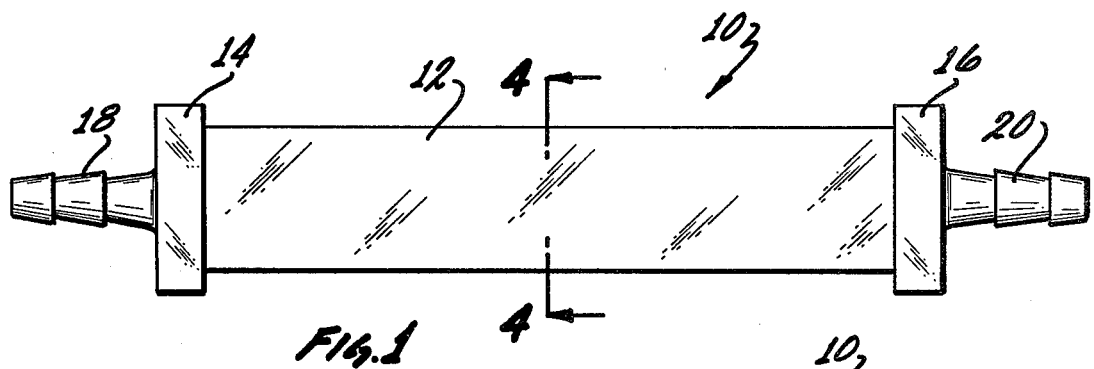
FIG. 1 is an external side view of an apparatus for treating hydrocarbon fuel of the present invention.

As shown in FIG. 1, a magnetic device 10 constructed in accordance with the teachings of the present invention includes an outer casing 12 and a pair of end caps 14 and 16. Each end cap includes integral fitting as shown by fittings 18 and 20. The fittings 18 and 20 are used to provide for connection within a fuel line and it is to be appreciated that other forms of fittings may be used depending upon the nature of the fuel line. For example, the fittings 18 and 20 shown in FIG. 1 could be used with a fuel line formed from a flexible material, but threaded fittings may also be used if the fuel line is formed from a rigid material. Generally, the outer casing 12 and the end caps 14 and 16, including the fittings 18 and 20, are composed of non-magnetic material such as aluminum, brass or even plastic material.

Figure 2:
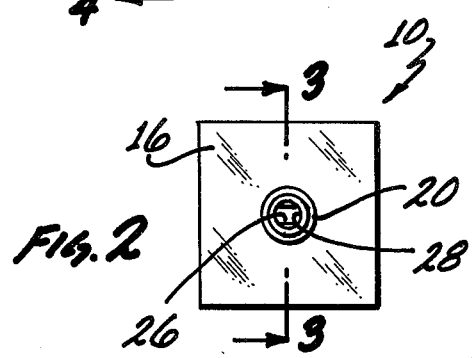
FIG. 2 is an end view of the device of the present invention.

FIG. 2, which illustrates the magnetic device 10 of the present invention shown from the right hand side of FIG. 1, shows that the general configuration of the magnetic device 10 is square. However, it will be appreciated that other external configurations for the magnetic device of the present invention may be used and the invention is not to be limited to any particular configuration. For example, the external configuration may be rectangular or cylindrical as long as the internal magnetic members are designed to properly fit within the external configuration.

Figure 3:
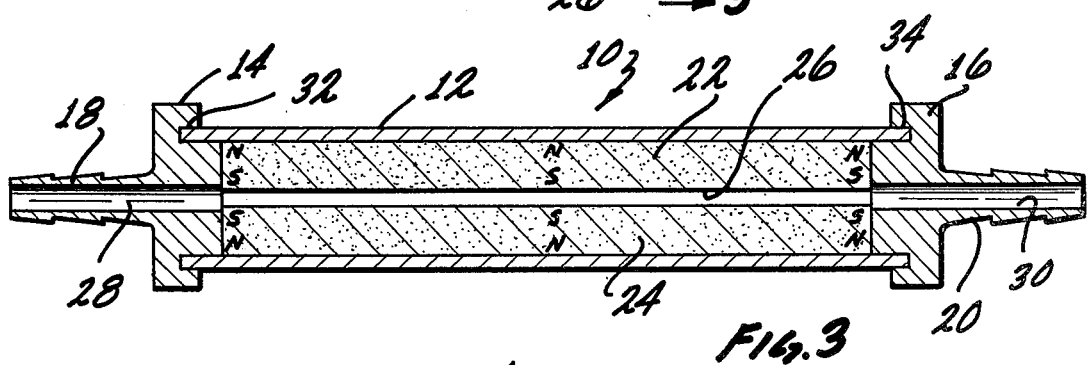
FIG. 3 is a cross-sectional view taken along lines 3—3 of FIG. 2.
Figure 4:
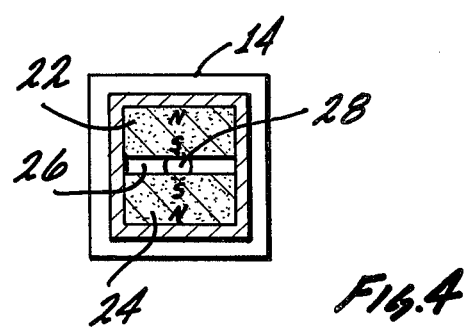
FIG. 4 is a cross-sectional view taken along lines 4—4 of FIG. 1.

As shown in the cross-sectional views of FIGS. 3 and 4, the outer casing 12 receives and supports a pair of elongated spaced permanent magnets 22 and 24. The magnets 22 and 24 are shown to be rectangular in cross-section and are magnetized to have a north pole extending substantially along one elongated face of the magnet and a south pole extending along the opposite elongated face. The magnets are arranged within the casing 12 to have like poles facing each other so that the magnets repel each other and maintain the magnets in the position shown within the walls of the casing 12. As shown in FIGS. 3 and 4, the south poles face each other to produce a powerful unipolar flux field between the magnets.

the spacing between the magnets 22 and 24 forms a passageway 26 for the hydrocarbon fuel. The hydrocarbon fuel as it passes through the passageway 26 is subjected to the powerful unipolar flux field. The flux field is not attenuated since there is no ferrous metal adjacent the passageway and since the magnets face each other rather than being at right angles to each other. The magnets may be made of any appropriate magnetic material and in particular, magnetic material generally referred to as "Cermat," which is a ceramic magnetic material, has been found to be particularly appropriate since this type of magnetic material generally holds its magnetism even when subjected to high temperatures. It will be appreciated that hydrocarbon fuel lines may be subjected to high temperatures, for example, when the fuel line is adjacent to an engine such as an automobile engine.

As shown in FIG. 3, each of the end caps 14 and 16 and their integral fittings 18 and 20 include a passageway. Specifically, passageways 28 and 30 extend through the end caps to positions adjacent and in communication with the ends of the passageway 26. The hydrocarbon fuel therefore is passed through the passageway 26 and is subjected to the unipolar magnetic flux field provided by the magnets 22 and 24.

Each end fitting 16 and 18 may include a groove as shown by grooves 32 and 34. The grooves 32 and 34 have a configuration complementary to the outer configuration of the casing 12 so that the opposite end portions of the casing 12 are received within the grooves 32 and 34. The end portions of the casing 12 are sealed within the grooves 32 and 34 by appropriate means such as an epoxy adhesive or by welding. The magnetic device of the present invention thereby has the fuel substantially pass from one end fitting to the other and through the passageway 26 without leakage of the fuel.

It is to be appreciated that although the invention has been described with reference to the use of two magnets 22 and 24, additional magnets may be used. For example, for ease of manufacturing, each magnet may be composed of two or more pieces extending along the same longitudinal axis and with the same magnetic relationships shown in FIGS. 3 and 4. Also, the invention has been shown with a rectangular cross-sectional configuration for each magnet and with the ratio between the long sides and the short sides more than two to one so as to produce an overall square configuration for the magnetic device 10. However, it is to be appreciated that the magnets and the outer casing may take other configurations.

Although the invention has been described with reference to a particular embodiment, it is to be appreciated that various adaptations and modifications may be made and the invention is only to be limited by the appended claims.

I claim:

1. A magnetic device for treating hydrocarbon fuel, including
   a hollow elongated casing of non-magnetic material,
   the casing including a pair of end portions and with each end portion including a fitting for providing an inlet and outlet for the fuel,
   a pair of elongated magnets and with each magnet magnetized to have one pole extending along one longitudinl face and the other pole extending along the opposite longitudinal face and with each longitudinal face having a particular width,
   a pair of magnets located within the casing and retained in position by the inner walls of the casing and with faces of the magnets having like poles spaced from each other and substantially parallel to each other and with the distance between the spaced faces of the pair of magnets substantially smaller than the particular width of the spaced faces to form an elongated substantially rectangular cross-section passageway between the magnets for the fuel in communication with the inlet and outlet fittings and with the passageway being substantially free of any ferrous metal, and
   the pair of magnets providing a substantially unipolar flux field on fuel flowing in the passageway between the magnets.

2. The magnetic device of claim 1 wherein
   the cross-section of each magnet is rectangular and having a ratio between the long side and the short side of more than two to one and wherein the long sides of the magnets are spaced from each other and with the casing having a substantially square configuration.

3. The magnetic device of claim 1 wherein
   the magnets are formed from a ceramic magnetic material.

4. The magnetic device of claim 1 wherein
   the pair of end portions are formed by separate end caps and with the end caps receiving and sealed to the opposite ends of the elongated casing.

5. A magnetic device for treating hydrocarbon fuel, including
   an elongated substantially rectangular cross-section passageway substantially free of ferrous metal and having an inlet and an outlet for the passage of the hydrocarbon fuel,
   a pair of elongated magnets and with each magnet magnetized to have one pole extending along one longitudinal face and the other pole extending along the opposite face and the other pole extending along the opposite longitudinal face and with each longitudinal face having a particular width,
   a pair of magnets located along and on opposite sides of the passageway and with faces of the magnets having like poles spaced from and substantially parallel to each other and with the distance between the spaced faces of the pair of magnets substantially smaller than the particular width of the spaced faces, and
   the pair of magnets providing a substantially unipolar flux field on fuel flowing in the passageway.

6. The magnetic device of claim 5 wherein the cross-section of each magnet is rectangular and wherein the long sides of the magnets are spaced from each other.

7. The magnetic device of claim 5 wherein
   the magnets are formed from a ceramic magnetic material.

8. the magnetic device of claim 5 wherein
   the magnets are enclosed in a hollow casing of non-magnetic material and with the casing including end portions forming the inlet and outlet for the hydrocarbon fuel and with the space between the spaced magnets forming the passageway.

* * * * *